United States Patent
Nakajima et al.

(10) Patent No.: US 6,387,301 B1
(45) Date of Patent: May 14, 2002

(54) METHOD OF PRODUCING SOLID FATTY MICROSPHERES

(75) Inventors: Mitsutoshi Nakajima; Yuji Kikuchi; Hiroshi Nabetani, all of Ibaraki; Jihong Tong, Saitama; Minoru Seki, Tokyo; Shinji Sugiura, Ibaraki, all of (JP)

(73) Assignees: Japan as represented by Director of National Food Research Institute, Ministry of Agriculture, Forestry and Fisheries, Ibaraki; Bio Oriented Technology Research Advancement Institution, Tokyo, both of (JP)

( * ) Notice: Subject to any disclaimer, the term of this patent is extended or adjusted under 35 U.S.C. 154(b) by 0 days.

(21) Appl. No.: 09/460,905

(22) Filed: Dec. 14, 1999

(30) Foreign Application Priority Data

Mar. 24, 1999 (JP) ............................................ 11-078862

(51) Int. Cl.[7] ............................ B01J 13/02; B01J 13/04; B01J 13/06

(52) U.S. Cl. ............................ 264/4.4; 264/46; 264/41; 264/4; 43/138

(58) Field of Search ............................ 264/4.4, 4.6, 4.1, 264/4; 430/138

(56) References Cited

U.S. PATENT DOCUMENTS 6,143,211 A * 11/2000 Mathiowitz et al. ........... 264/4

FOREIGN PATENT DOCUMENTS

JP 9-225291 9/1997

* cited by examiner

Primary Examiner—Duc Truong
(74) Attorney, Agent, or Firm—Carrier, Blackman & Associates, P.C.; Joseph P. Carrier; William D. Blackman

(57) ABSTRACT

A method to efficiently and continuously produce microspheres of natural oils and fats having a high melting point, the average particle diameter of which is in dozens of $\mu$m and is uniform, comprising the steps of heating oils and fats having a high melting point to a temperature greater than the melting point thereof to liquify same holding the oils and fats in a liquid state, forming a dispersed phase of the liquid oils and fats, pressurizing the dispersed phase and forming emulsions by dispersing the dispersed phase into a continuous phase via a plurality of microchannels, and isolating microspheres of the oils and fats having a high melting point by removing the continuous phase from the emulsions.

15 Claims, 10 Drawing Sheets

METHOD OF PRODUCING SOLID FATTY MICROSPHERES

BACKGROUND OF THE INVENTION

1. Field of the Invention

The present invention relates to a method of producing solid fatty microspheres (fine particles) for use in the food industry, the manufacturing of drugs and cosmetics, etc.

2. Description of Related Art

At present, natural oils and fats having a high melting point such as fish oils, animal fats or the like are dumped as waste oils. This is a serious loss from the standpoint of resource utilization and efficiency.

Therefore, it is considered that natural oils and fats having a high melting point such as fish oils, animal fats or the like can be utilized in the production of foods, drugs and cosmetics. However, in this case, it is necessary to adjust or modify the natural oils and fats having a high melting point to be dozens of $\mu$m in the size thereof and to be in the form of uniform particles.

As a method of producing solid microspheres, there is already known a suspension polymerization method and an emulsion polymerization method.

In the suspension polymerization method, microspheres are composed by polymerizing a dispersed phase of emulsions. In the emulsion polymerization method, microspheres are composed by conducting a polymerization reaction in the micelle of a surfactant.

With the suspension polymerization method, it is difficult to obtain monodispersed microspheres because the distribution of particle diameter of produced microspheres depends on that of the emulsions.

With the emulsion polymerization method, the particle diameter of composed microspheres is usually about 0.1 $\mu$m. If a seed emulsion polymerization method or a two-stage swelling method is used, microspheres the diameter of which is dozens of $\mu$m can be obtained; however, it takes complicated processes involving high costs.

Furthermore, with the conventional methods, it is impossible to produce microspheres consistently and in large quantities.

SUMMARY OF THE INVENTION

According to the present invention, there is provided a method of consistently producing microspheres of natural oils and fats having a high melting point, such as hydrogenated fish oils, cattle fats or the like, the microspheres being dozens of $\mu$m in size and having a small standard deviation (being uniform in size).

Specifically, according to the present invention, there is provided a method of producing microspheres, comprising the following steps:

heating oils and fats having a high melting point to a temperature above the melting point thereof to liquify same, holding oils and fats to be in a liquid state; and forming a dispersed phase of the liquid oils and fats;

pressurizing the dispersed phase and forming emulsions by dispersing said dispersed phase into a continuous phase via a plurality of microchannels having a predetermined width;

producing a suspension of solid microspheres by cooling and solidifying said emulsions; and withdrawing the microspheres of oils and fats having a high melting point by removing said continuous phase from said suspension.

It is preferable to employ an apparatus which the applicant proposes in Japanese Laid-Open Patent Application No. 9-225291 as an apparatus for producing the above-mentioned emulsions.

In the apparatus proposed in Japanese Laid-Open Patent Application No. 9-225291, emulsions are produced by dispersing a liquid dispersed phase into a continuous phase at room temperature. Therefore, the apparatus can not be applied directly to the production of emulsions in which natural oils and fats having a high melting point are used as a dispersed phase; however, if a heating apparatus and a constant temperature apparatus for natural oils and fats having a high melting point are added, the apparatus can be applied to the implementation of the present invention.

In the above-mentioned apparatus, microchannels are formed, and via the microchannels a dispersed phase enters a continuous phase. In this case, it is preferable that a convex base is formed on a surface of another base, a plurality of walls are formed on a terrace which is an upper surface of the convex base, and spaces between the walls define microchannels.

In addition, it is preferable to add a surfactant, besides the oils and fats having a high melting point which become liquid, as the dispersed phase. By adding a surfactant, the interfacial tension decreases, and as a result of this, it is possible to decrease the pressure necessary to obtain breakthrough (i.e. minimum pressure at which the dispersed phase enters the continuous phase).

As mentioned above, it is necessary to apply a predetermined pressure to the dispersed phase to make the dispersed phase enter the continuous phase. It is preferable to set the pressure at 0.5 kPa or more and 1.3 kPa or below in a case where the terrace is positioned at a distance of 2–4 mm from an end of the base and the microchannels are 10–20 $\mu$m in width and 5–10 $\mu$m in depth. In the case where pressure is set below 0.5 kPa, it is hard to make the dispersed phase enter the continuous phase. On the other hand, in the case where pressure is over 1.3 kPa, it is hard to form microspheres because portions of the dispersed phase being dispered into the continous phase become connected.

As a means for withdrawing microspheres from emulsions in which the dispersed phase is dispersed within the continuos phase in of the form of microspheres, it is possible to freeze and dry, the suspension of solid microspheres to remove the continuous phase after leaving emulsions for a predetermined period of time at room temperature.

BRIEF DESCRIPTION OF DRAWINGS

FIG. 6(A) is a view of dry microspheres obtained in Embodiment 1 of the present invention and FIG. 6(B) is a photomicrograph on which FIG. 6(A) is based;

DETAILED DESCRIPTION OF THE PREFERRED EMBODIMENTS

Hereinafter, detailed explanation of the embodiments according to the present invention will be given by referring to the attached drawings.

Figure 1:
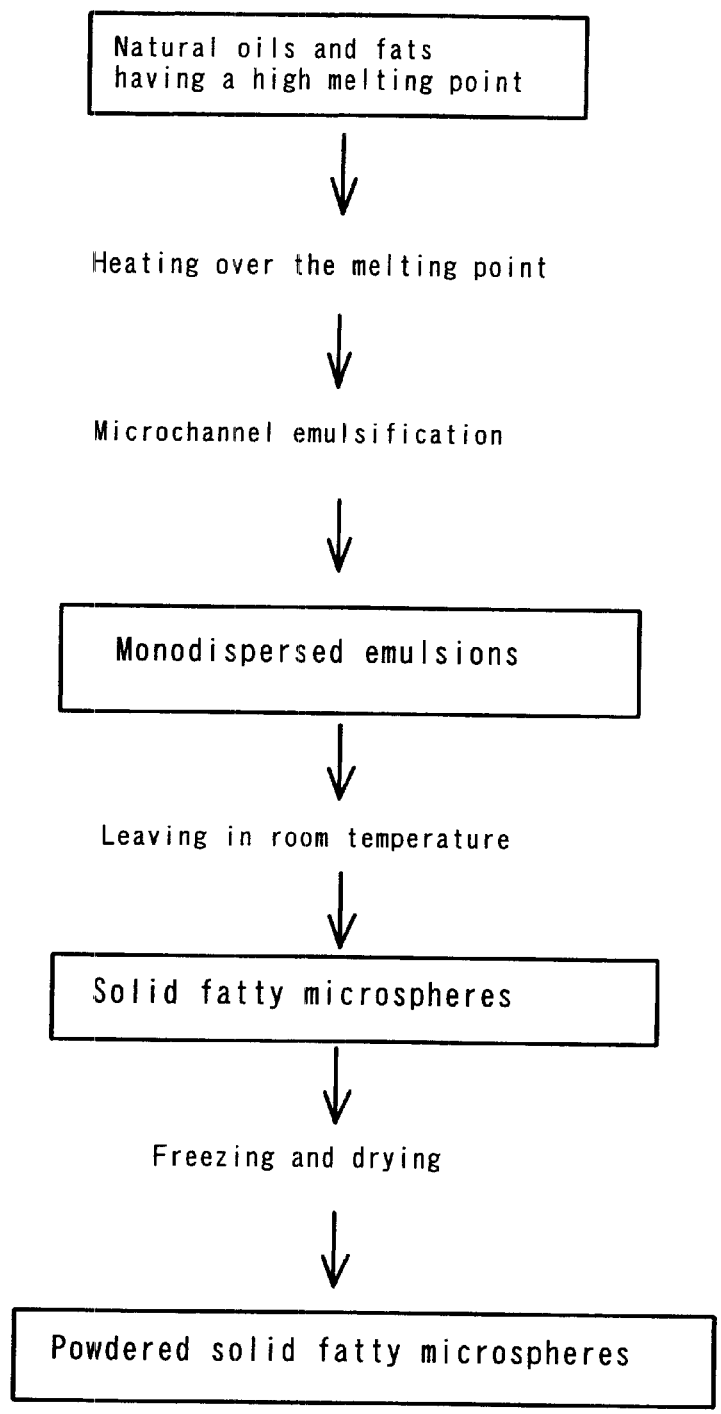
FIG. 1 is a block diagram giving an outline of the present invention in order of the process steps.

FIG. 1 is a block diagram giving an outline of the present invention in order of the process. In the present invention, natural oils and fats having a high melting point, such as hydrogenated fish oils, cattle fats or the like, are prepared first.

Next, the natural oils and fats having a high melting point are liquified by heating to a temperature above the melting point thereof. Monodispersed emulsions are produced by dispersing the liquified natural oils and fats as a dispersed phase into a continuous phase such as water or the like.

Thereafter, a suspension of solid fatty microspheres is formed after leaving the emulsions at room temperature, and solid fatty microspheres are separated from the continuous phase by freezing and drying this suspension to remove the continuous phase.

Hereinafter, explanation of a first embodiment of an apparatus for producing monodispersed emulsions will be given by referring to FIG. 2–FIG. 5.

In the apparatus for producing emulsions, temperature in a body 1 can be controlled by thermally connecting the body 1 with a constant temperature tank 2.

A plate 3, comprising a glass plate and so on, is fitted into one opening of the body 1, and a lid body 4 is fitted another opening of the body 1. A supply port for a dispersed phase (O) 5 is formed in the center of the lid body 4, a supply port for a continuous phase (W) 6 is formed off the center of the lid body 4 (above in the drawing), and a withdrawal port for emulsions (E) 7 is formed off the center of the lid body 4 (below in the drawing).

A reservoir for a dispersed phase 8 is connected with the supply port for a dispersed phase 5 via a pipe surrounded by a heater 9. A reservoir for a continuous phase 10 is connected with the supply port for a continuous phase 6 via a pipe. In addition, a pipe for withdrawing 11 is connected with the withdrawal port for emulsions 7.

In this case, the reservoir for a dispersed phase 8 and the reservoir for a continuous phase 10 can be adjusted up and down (in height relative to the apparatus), and thereby, pressure acting on the dispersed phase (or the continuous phase) can be adjusted.

Figure 4A:
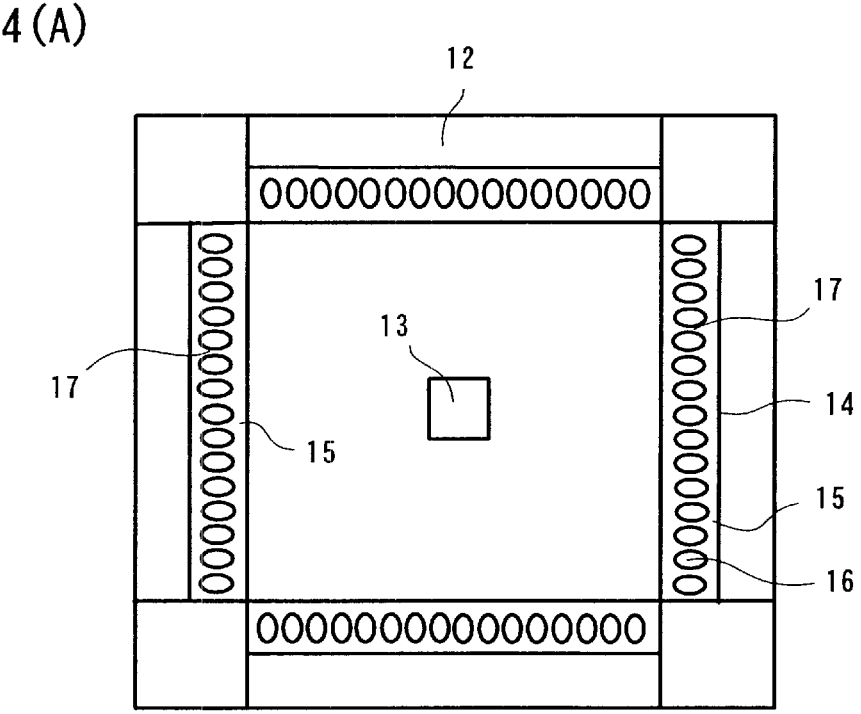
FIG. 4(A) is a plan view of a base and FIG. 4(B) is a lower-side view of a base according to the present invention.
Figure 4B:
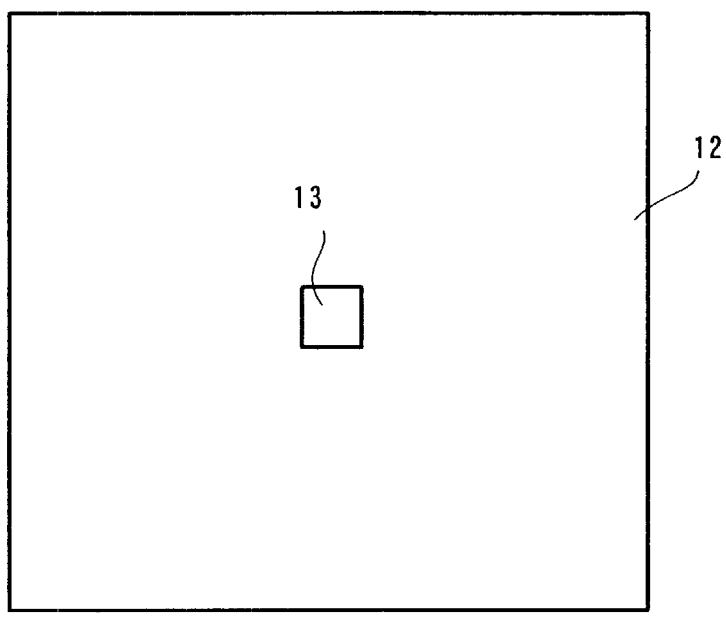
Figure 5:
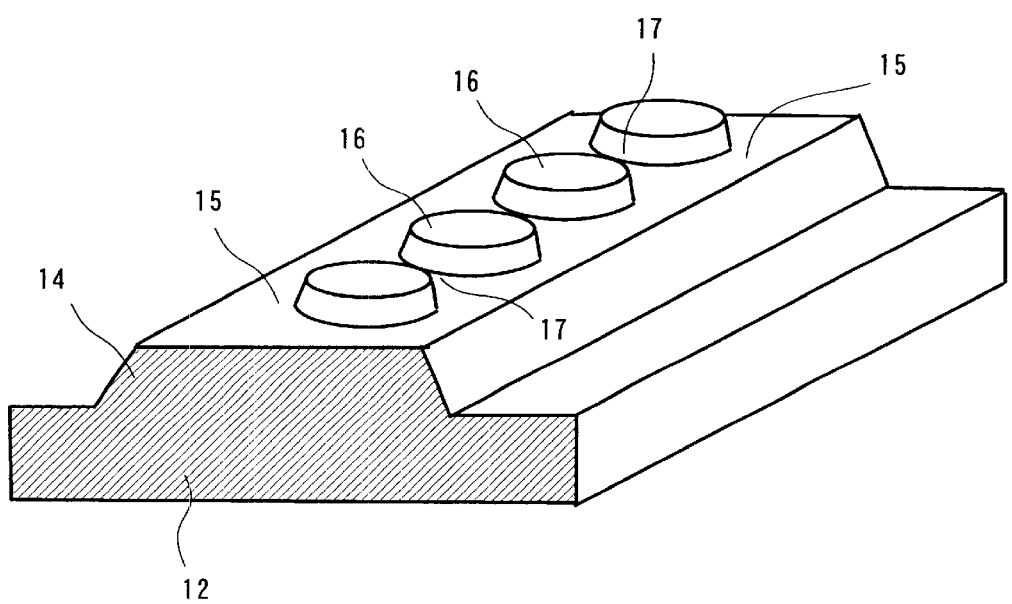
FIG. 5 is an enlarged perspective view of microchannels according to the present invention.

A base 12 is positioned at a space between the plate 3 and the lid body 4. An opening 13 is formed in the center of the base 12. A convex base 14 is formed at the front side of the base 12 opposing the plate 3, surrounding the opening 13 which is rectangular in shape (as shown in FIG. 4(A)). A terrace 15 is an upper surface of the convex base 14, and a plurality of convex portions 16 are formed on the terrace 15 at predetermined intervals. Microchannels 17 are the portions between the plurality of convex portions 16. The microchannel 17 is 13.1 µm in width, 5.7 µm in height, and 26.2 µm in terrace length, for example.

It is preferable to adopt a fine processing (a wet etching process or a dry etching process) in order to form the convex base 14 including the microchannels 17. For example, the microchannels 17 are formed on the silicon base 12 to be 0.1–100 µm across by using a wet etching process or a dry etching process.

Figure 2:
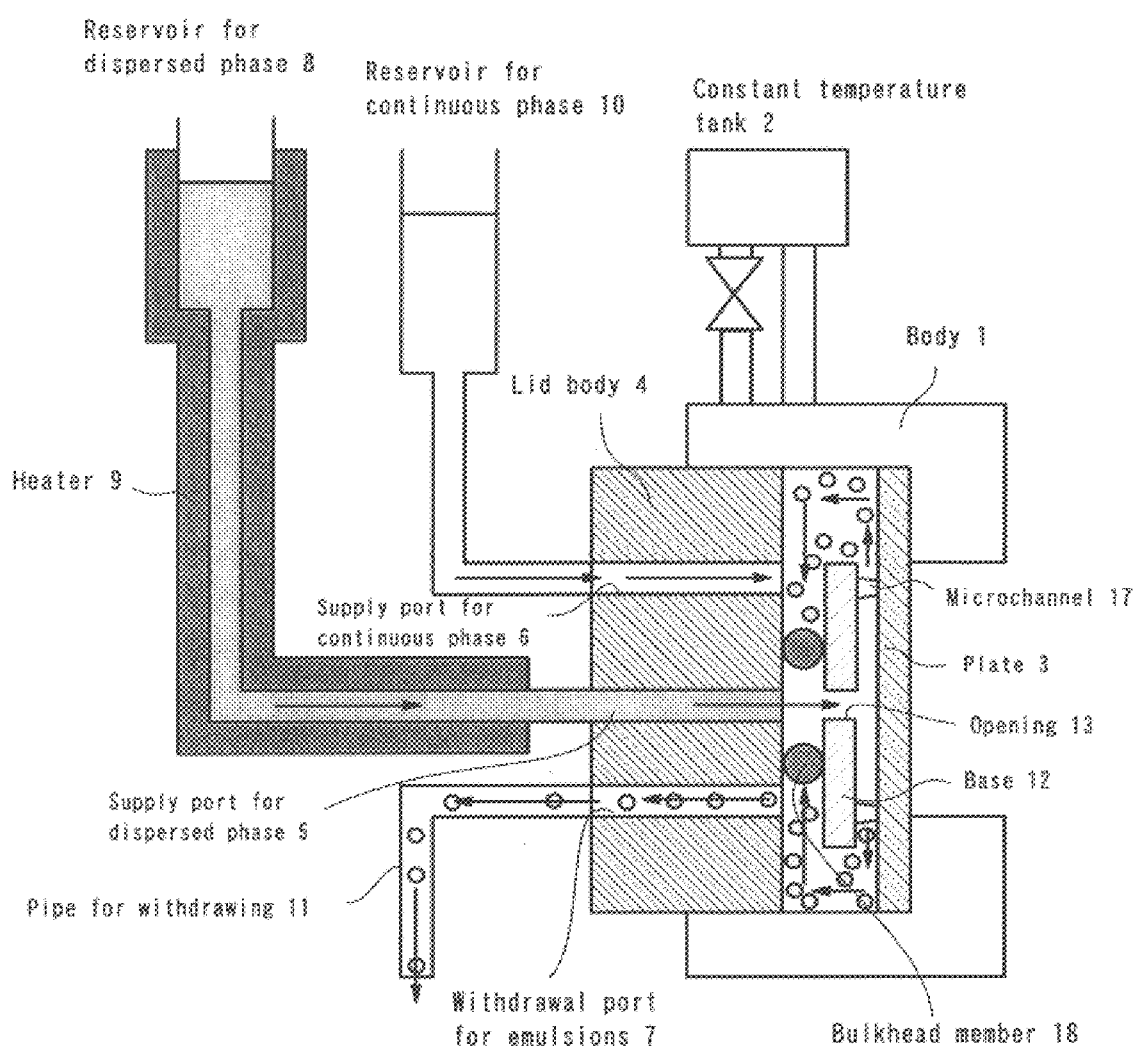
FIG. 2 is a explanatory view of an apparatus for producing emulsions applied to the embodiment of the present invention.
Figure 3:
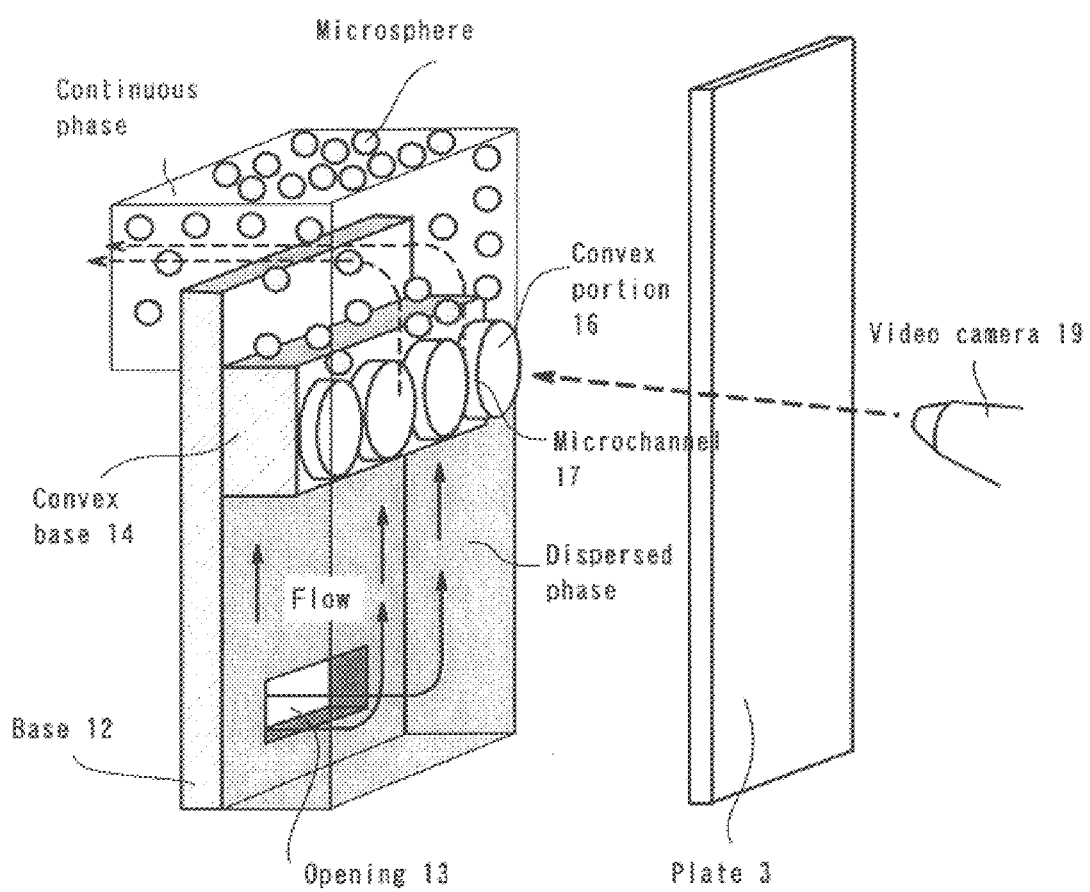
FIG. 3 is an enlarged detail view of an important portion of the apparatus for producing emulsions.

In addition, a bulkhead member 18, such as an o-ring or the like, stands between the base 12 and the lid body 4 (shown in FIG. 2 only). The convex portions 16 are flexibly pushed onto the inside of the plate 3 via the bulkhead member 18. The supply port for the dispersed phase 5 opens to an inside region surrounded by the bulkhead member 18 within the gap between the plate 3 and the lid body, while the supply port for the continuous phase 6 and the withdrawal port for emulsions 7 open to the outside region outside of the bulkhead member 18, within the gap between the plate 3 and the lid body 4.

A camera 19 is positioned at the outside of the plate 3 and connected with a video system.

In this apparatus, a dispersed phase (O) 15 pressurized and supplied to the inside region within of the bulkhead member 18 via the supply port 5 and enters the gap between the plate 3 and the base 12 via the opening 13, and the dispersed phase (O) enters a continuous phase (W) through the microchannels 17. At this time, the dispersed phase (O) becomes particles having a predetermined diameter and emulsions (E), in which the dispersed phase (O) particles are dispersed into the continuous phase (W), are formed.

The apparatus for producing monodispersed emulsions is not limited to the above-described structure.

For example, in the drawings, the plate 3, the lid body 4 and the base 12 are oriented in a vertical direction; however, these may be oriented in a horizontal direction.

It is also possible to use a cross-flow type apparatus, comprising: a base which is accommodated in a case and a plate which is installed on a side of the base for forming a flow path beside the base, wherein microchannels opening into the flow path in a cross (perpendicular) direction are formed in the base, and a dispersed phase is supplied from a cross direction to a continuous phase which is in the state of flowing.

Hereinafter, embodiments of the present invention and preferable conditions will be discussed.

Embodiment 1

Distribution of Particle Diameter

Microchannel emulsification was conducted at 70° C. by using tripalmitin (melting point around 58° C.) dissolved with sorbitanmonopalmitate (Span40), which is a nonionic surfactant, in the concentration of 1% as a dispersed phase and using water as a continuous phase.

The reservoir for the dispersed phase was lifted up (elevated relative to the apparatus, and specifically, relative to the supply port) in, in order to obtain the resultant appropriate supply port pressure for carrying out emulsification. When the supplying pressure at the supply port for dispersed phase 5 reached 0.53 kPa, the dispersed phase began to pass through the microchannels and the production of emulsions started.

When the supplying pressure was raised further, emulsions were produced from 90% of the microchannels.

Figure 6A:
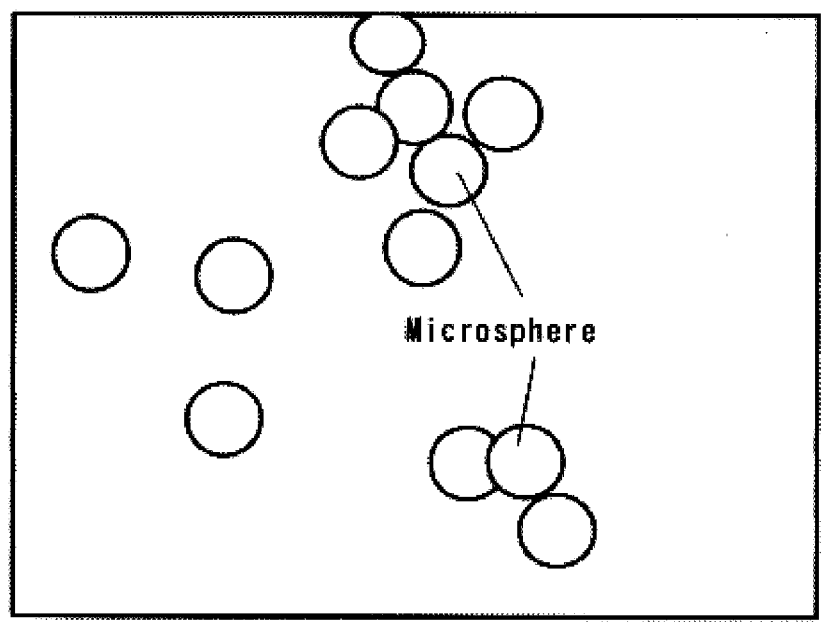
Figure 6B:
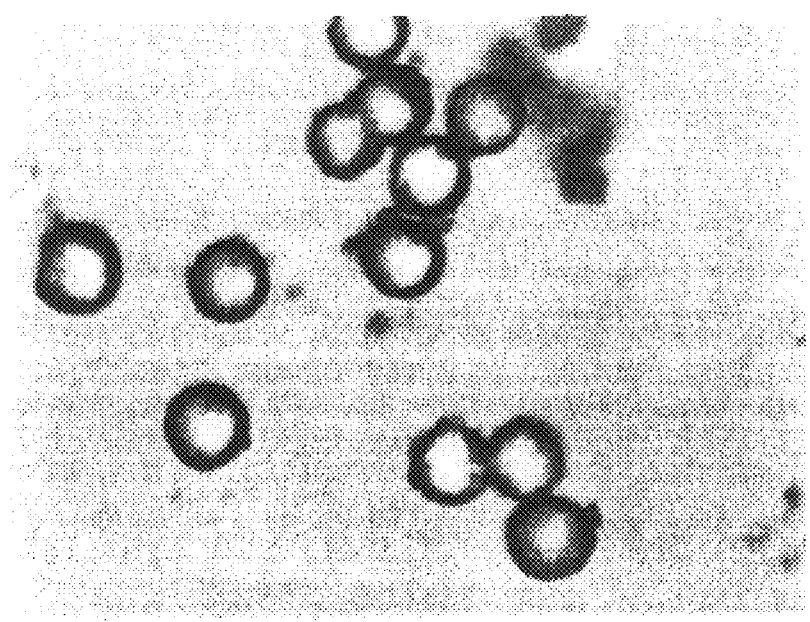
Figure 7:
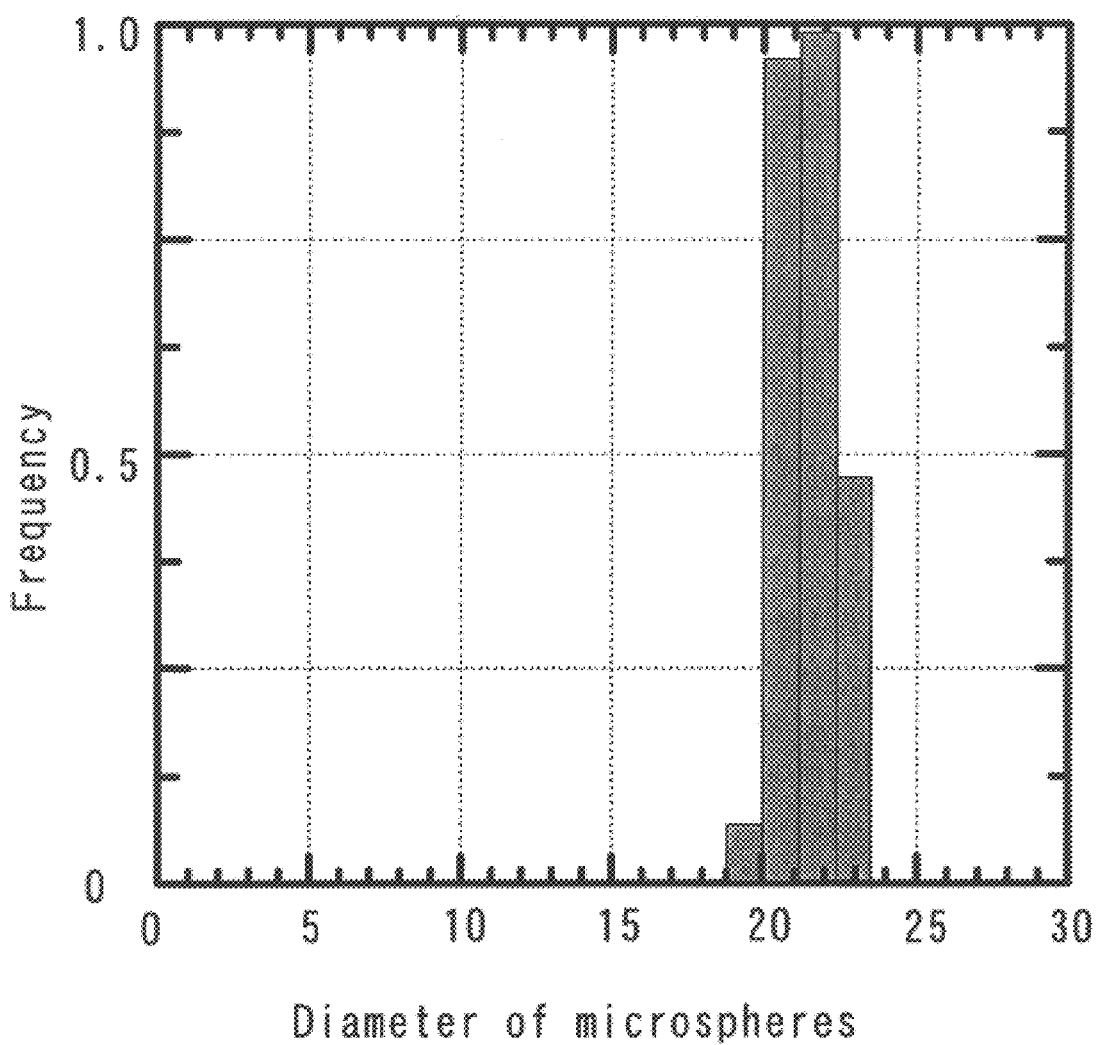
FIG. 7 is a graph showing a distribution of particle diameters of microspheres obtained in Embodiment 1 of the present invention.

The produced emulsions were withdrawn, and solidified by being held at room temperature, and thereby a suspension of solid fatty microspheres was obtained. Thereafter, white powder was obtained by freezing and drying this suspension. As shown in FIGS. 6(A), 6(B) and FIG. 7, powdered solid fatty microspheres are 21.7 µm in average particle diameter with one standard deviation being 0.78 µm.

Embodiment 2

Influences of Pressure on Microchannel Emulsification

Microchannel emulsification was conducted at 70° C. by using tripalmitin (melting point around 58° C.) dissolved with polyoxyethylenesorbitanmonopalmitate (Tween40), which is a nonionic surfactant, in the concentration of 0.3% as a dispersed phase and using water as a continuous phase.

Figure 8:
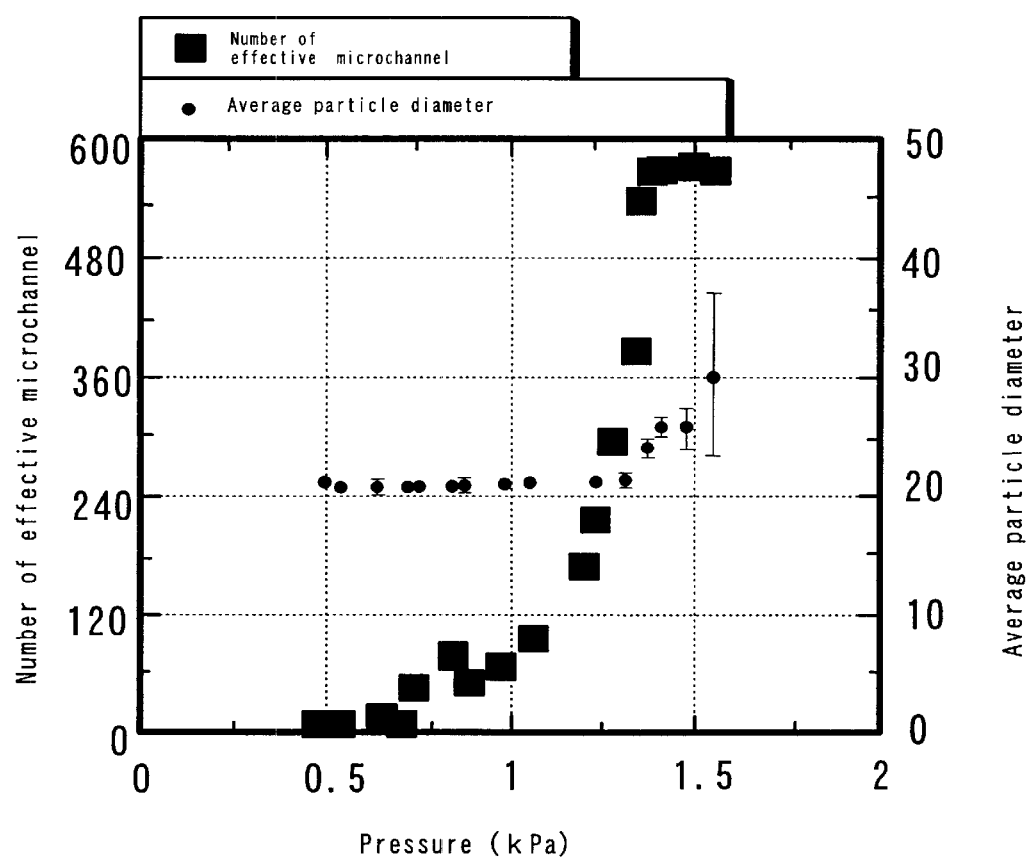
FIG. 8 is a graph showing a relationship between pressure and effective microchannels, and a relationship between pressure and an average particle diameter of produced microspheres.

The reservoir for the dispersed phase was elevated for carrying out microchannel emulsification. The average particle diameter and changes in the number of microchannels taking part in the production of microspheres were examined. The results are shown in FIG. 8.

The results illustrate the following:

In a case where the pressure ranged from 0.5 kPa to 1.3 kPa, the higher the pressure was, the larger the number of channels producing microspheres (liquid drops) was and the higher the speed of producing microspheres in each channel was. Additionally, in this range, the distribution of particle diameter of the emulsions was hardly influenced by the changes in the pressure. In a case where the pressure was over 1.3 kPa, the flow rate of the dispersed phase was too rapid, resulting in large liquid drops being produced, and the phenomenon wherein the dispersed phase flowed out continuously was observed. It became clear that it is necessary to stably supply the continuous phase to the exit side of microchannels in order to overcome or avoid this phenomenon.

Embodiment 3

Influences of Adding Surfactant on Microchannel Emulsification

Figure 9:
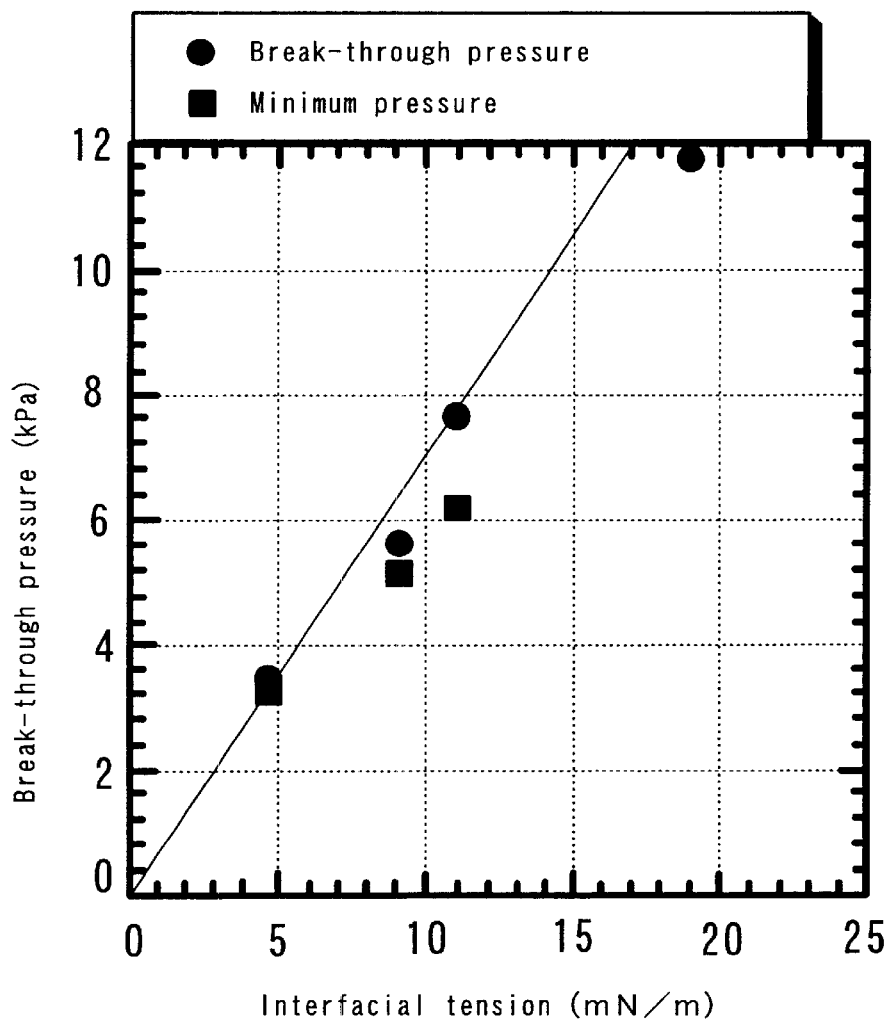
FIG. 9 is a graph showing a relationship between an interfacial tension and pressure necessary to obtain breakthrough.

Microchannel emulsification was conducted at 70° C. by using hydrogenated fish oils as a dispersed phase and using water as a continuous phase. In this case, the added surfactant was changed and the possibility of microchannel emulsification and the result of examining the emulsification actions are shown in Table 1.

relationship between an interfacial tension and pressure required to obtain break-through was examined, and the result is shown in FIG. 9.

The result shown in FIG. 9 coincides with theory equation derived from Laplace's equation that expresses differences between the inside and the outside of a bent interface.

Embodiment 4

Influences of Microchannel Form on Microchannel Emulsification

Microchannel emulsification was conducted at 70° C. by using tripalmitin (melting point around 58° C.) dissolved with is polyoxyethylenesorbitanmonopalmitate (Tween40), a nonionic surfactant, in the concentration of 0.3% as a dispersed phase and using water as a continuous phase.

In this case, four forms of microchannels shown in FIGS. 10 (A)–(D) are used, and influences of microchannel form are examined.

Figure 10A:
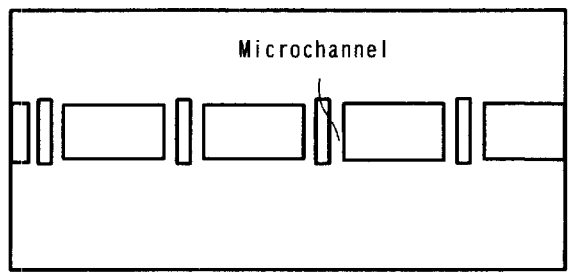
FIGS. 10(A)–(D) are showing forms of various microchannel designs.
Figure 10B:
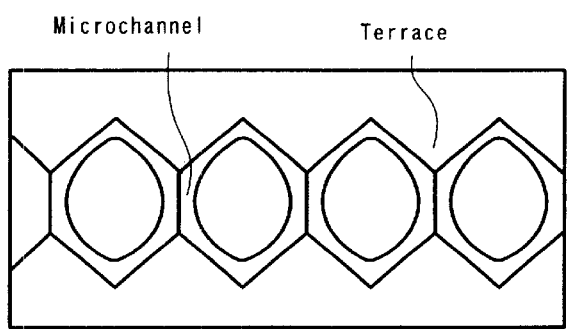
Figure 10C:
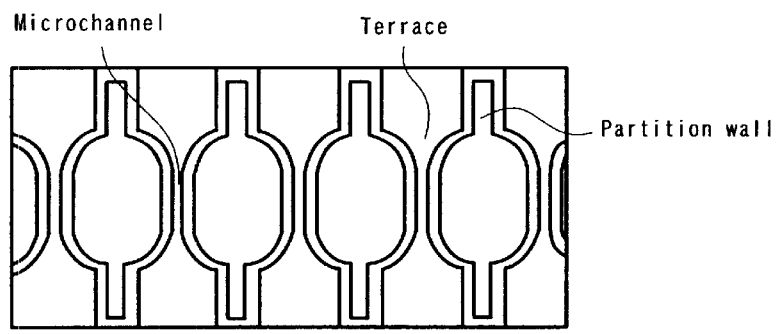
Figure 10D:
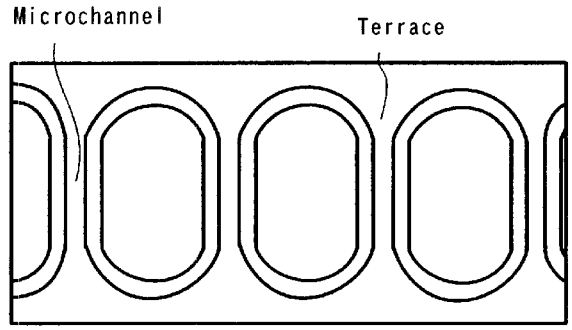

The microchannels shown in FIG. 10(A) have neither a terrace nor a partition wall, the microchannels shown in FIG. 10(B) have a terrace but no partition walls, the microchannels shown in FIG. 10(C) have both a terrace and a partition wall, and the microchannels shown in FIG. 10(D) have a terrace but no partition wall as with the microchannels shown in FIG. 10(B). However, in FIG. 10(D) the height of the microchannels is lower.

The maximum efficiency of channels (the rate of channels which stably produce liquid drops) are examined in each case where microchannel emulsification was conducted with a bases on which microchannels having each of the shapes shown in were formed. The results are shown in Table 2.

TABLE 2

|     | Maximum efficiency [%] | Average particle diameter [μm] | Standard deviation [%] |
| --- | --- | --- | --- |
| (A) | 22.0 | 57.2 | 8.15 |
| (B) | 92.0 | 30.0 | 0.60 |
| (C) | 78.5 | 29.2 | 0.52 |
| (D) | 95.5 | 21.1 | 0.51 |

The results show of these shapes a terrace is necessary in order to stably produce liquid drops, and that by providing

TABLE 1

| Surfactant | Concentration [%] | Interfacial tension [mN/m] | Productive capacity of microchannel | Break-through pressure [kPa] | Average particle diameter [μm] | Standard deviation [%] | Maximum efficiency [%] |
| --- | --- | --- | --- | --- | --- | --- | --- |
| Not used |  | 24.3 | Δ | >10.0 | (19.2) | (0.47) | — |
| Soybean lecithin | 1 | 16.6 | x | — | — | — | — |
| Glycerol fatty acid ester | 1 | 22.1 | Δ | >10.0 | (22.4) | (0.52) | — |
| Polyoxyethylene (20) sorbitanmonopalmitate (Tween 40) | 1 | 3.65 | ○ | 3.22 | 23.4 | 0.5 | 41 |
| Sorbitanmonopalmitate (Span 40) | 1 | 4.65 | ○ | 3.29 | 19.9 | 0.34 | 88 |

Among the surfactants used in this embodiment, in a case where an anionic surfactant, such as sodium lauryl sulfate or the like, or a surfactant which is nonionic and is efficient in emulsification, such as a Span system surfactant or the like, is used, stable microchannel emulsification was confirmed.

In addition, when Span 40 was used as a surfactant, the concentration of the surfactant was changed. In this case, a a partition wall the stability of microchannel emulsification is increased, and that even if the height of the microchannels is low, it is possible to conduct stable microchannel emulsification.

As is explained above, according to the present invention, it is possible to continuously and in large quantities produce microspheres of oils and fats having a high melting point, the average particle diameter of which is in dozens of μm and is uniform (having standard deviation below 5%), by heating oils and fats having a high melting point to a temperature greater than the melting point thereof to liquify same holding the oils and fats in a liquid state forming a dispered phase of the liquid oils and fats pressurizing the dispersed phase and forming emulsions by dispersing said dispersed phase into a continuous phase via a plurality of microchannels having a predetermined width, producing solid microspheres in suspension by cooling and thus solidifying said emulsions, and isolating solid microspheres of the oils and fats having a high melting point by removing the continuous phase from the emulsions.

It is possible to conduct stable (or more stable) microchannel emulsification by adding an anionic or nonionic surfactant to the dispersed phase. In the present invention, since break-through pressure is estimated from Laplace's equation, it is also possible to efficiently produce microspheres by controlling the pressure applied to the dispersed phase.

In addition, it is possible to further promote efficiency in producing microspheres by devising microchannel forms.

As a result of this, it is possible to further utilize fish oils, animal fats or the like, which are commonly dumped as waste oils, for applications in the food industry, the manufacturing of drugs and cosmetics, etc., and to thereby contribute to efficient utilization of resources.

Although there have been described what are the present embodiments of the invention, it will be understood that variations and modifications may be made thereto without departing from the gist, spirit, or essence of the invention. The scope of the invention is indicated by the appended claims.

What is claimed is:

1. A method of producing solid fatty microspheres, comprising the following steps:
  heating oils and fats having a high melting point to a temperature greater than the melting point thereof to liquify same, holding said oils and fats in a liquid state and forming a dispersed phase of the liquid oils and fats;
  pressurizing the dispersed phase and forming emulsions by dispersing said dispersed phase into a continuous phase via a plurality of microchannels having a predetermined width;
  producing solid microspheres of said oils and fats in suspension by cooling and thus solidifying said emulsions; and
  isolating said solid microspheres by removing said continuous phase from said suspension.

2. A method of producing solid fatty microspheres as described in claim 1, wherein said microchannels are formed on a silicon base, with said microchannels being 0.1–100 μm across.

3. A method of producing solid fatty microspheres as described in claim 1, wherein said microchannels are defined between a plurality of walls formed on a terrace which is an upper surface of a convex base formed on a surface of another base.

4. A method of producing solid fatty microspheres as described in claim 1, wherein a surfactant is added in forming said dispersed phase.

5. A method of producing solid fatty microspheres as described in claim 1, wherein said solid microsphere isolating step involves freezing and drying said suspension for removing the continuous phase from said emulsions.

6. A method of producing solid fatty microspheres as described in claim 2, wherein said microchannels are formed using at least one of a wet etching process and a dry etching process.

7. A method of producing solid fatty microspheres as described in claim 1, wherein said isolated solid microspheres have an average particle size of at least 12 μm.

8. A method of producing solid fatty microspheres as described in claim 1, wherein said dispersed phase is pressurized to a pressure x in said pressurizing step, where x is in a range of $0.5 \text{ kPa} \leq x \leq 1.3 \text{ kPa}$.

9. A method of producing solid fatty microspheres as described in claim 3, wherein said terrace is positioned at a distance of 2–4 mm from an end of said other base, and said microchannels are 10–20 μm wide and 5–10 μm deep.

10. A method of producing solid fatty microspheres as described in claim 1, wherein said solid microsphere producing step involves cooling said emulsions at room temperature.

11. A method of producing solid fatty microspheres as described in claim 1, wherein said dispersed phase consists essentially of said oils and fats in a liquid state.

12. A method of producing solid fatty microspheres as described in claim 1, wherein said emulsions forming step involves stably supplying the continuous phase to an exit side of said microchannels.

13. A method of producing solid fatty microspheres as described in claim 1, wherein said continuous phase comprises water.

14. A method of producing solid fatty microspheres as described in claim 1, wherein said solid microspheres have a standard deviation of less than 5%.

15. A method of producing solid fatty microspheres as described in claim 1, wherein said emulsions forming step involves storing said dispersed phase in a reservoir and supplying the dispersed phase to said microchannels through a supply port connected to said reservoir, and said pressurizing step involves maintaining said reservoir at an appropriate height above said supply port.

* * * * *

UNITED STATES PATENT AND TRADEMARK OFFICE
CERTIFICATE OF CORRECTION

PATENT NO. : 6,387,301 B1
DATED : May 14, 2002
INVENTOR(S) : Nakajima et al.

It is certified that error appears in the above-identified patent and that said Letters Patent is hereby corrected as shown below:

Column 1,
Line 57, after "holding" insert -- said -- ; change "state;" to -- state, --.

Column 2,
Line 38, change "continous" to -- continuous --.
Line 41, change "continuos" to -- continuous --.
Line 42, after "dry" delete the comma.
Line 48, change "a explanatory" to -- an explanatory --.

Column 3,
Line 35, after "fitted" insert -- into --.
Line 57, after "13" insert a comma.
Line 61, change "por-" to -- spaces --.
Line 62, delete "tions".

Column 4,
Line 10, before the comma insert -- 4 --.
Line 17, change "15" to -- is --.
Line 18, delete "of".
Line 19, after "5" insert a comma.
Line 53, change "in, in" to -- in --.

Column 6,
Line 13, delete "is".
Line 31, change "a bases" to -- bases --.
Line 32, before "were" insert -- Figs. 10(A) - 10(D) --.
Line 43, (the first line of text following "TABLE 2" data), after "show" insert -- that, --; after "shapes" insert a comma.

UNITED STATES PATENT AND TRADEMARK OFFICE
CERTIFICATE OF CORRECTION

PATENT NO. : 6,387,301 B1
DATED : May 14, 2002
INVENTOR(S) : Nakajima et al.

It is certified that error appears in the above-identified patent and that said Letters Patent is hereby corrected as shown below:

Column 7,
Line 5, after "same" insert a comma; after "state" insert a comma.
Line 6, after "fats" insert a comma.

Signed and Sealed this

Nineteenth Day of November, 2002

*Attest:*

*Attesting Officer*

JAMES E. ROGAN
*Director of the United States Patent and Trademark Office*